(12) United States Patent
Gilbertson et al.

(10) Patent No.: US 10,800,540 B2
(45) Date of Patent: Oct. 13, 2020

(54) TRANSPORT ELEMENT CLAMP SYSTEM

(71) Applicant: The Boeing Company, Chicago, IL (US)

(72) Inventors: Michael Leslie Gilbertson, Arlington, WA (US); Jon P. Michel, Clinton, WA (US); Mark L. Carpenter, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 435 days.

(21) Appl. No.: 15/668,370

(22) Filed: Aug. 3, 2017

(65) Prior Publication Data
US 2019/0039747 A1  Feb. 7, 2019

(51) Int. Cl.
| | | |
|---|---|---|
| *B64D 37/32* | (2006.01) | |
| *F16B 2/22* | (2006.01) | |
| *F16L 3/22* | (2006.01) | |
| *F16L 3/223* | (2006.01) | |
| *F16L 3/237* | (2006.01) | |
| *B64D 37/00* | (2006.01) | |
| *H02G 3/32* | (2006.01) | |
| *B64D 45/02* | (2006.01) | |

(Continued)

(52) U.S. Cl.
CPC ............ *B64D 37/32* (2013.01); *B64D 37/005* (2013.01); *F16B 2/22* (2013.01); *F16L 3/222* (2013.01); *F16L 3/2235* (2013.01); *F16L 3/237* (2013.01); *H02G 3/32* (2013.01); *B64C 1/406* (2013.01); *B64D 45/02* (2013.01); *B64D 2045/009* (2013.01)

(58) Field of Classification Search
CPC ......... F16L 3/2235; F16L 3/237; F16L 3/222; B64D 37/32; B64D 37/005; B64D 45/02; B64D 2045/009; B64D 47/00; H02G 3/32; B64C 1/406

USPC .................................................. 248/68.1, 55
See application file for complete search history.

(56) References Cited

U.S. PATENT DOCUMENTS 2,227,528 A * 1/1941 Adler .................... F16L 3/2235
                                                          174/135
2,355,742 A * 8/1944 Morehouse ........... F16L 3/2235
                                                          248/68.1

(Continued)

FOREIGN PATENT DOCUMENTS

| CA | 2538770 A1 | 9/2006 |
| EP | 2537745 A1 | 12/2012 |

OTHER PUBLICATIONS

Extended European Search Report, dated Aug. 22, 2018, regarding Application No. 18166962.3, 8 pages.

*Primary Examiner* — Muhammad Ijaz
(74) *Attorney, Agent, or Firm* — Yee & Associates, P.C.

(57) ABSTRACT

A transport element clamp system comprising a lower portion, an upper portion, and a channel system. The lower portion has a first number of cutouts and the upper portion has a second number of cutouts. The lower portion is configured to bridge a gap between two support structures in an aircraft. The upper portion is configured to interlock with the lower portion. The channel system is formed by the first number of cutouts and the second number of cutouts. The channel system is configured to receive a number of transport elements when the upper portion and the lower portion are coupled to each other. The transport element clamp system electrically isolates the number of transport elements from the two support structures.

20 Claims, 12 Drawing Sheets

(51) Int. Cl.
*B64D 45/00* (2006.01)
*B64C 1/40* (2006.01)

(56) References Cited

U.S. PATENT DOCUMENTS

| | | | | | |
|---|---|---|---|---|---|
| 2,356,318 | A | * | 8/1944 | Hayman | F16L 3/2235 24/135 R |
| 2,361,943 | A | * | 11/1944 | Issoglio | F16L 3/2235 174/135 |
| 2,362,124 | A | * | 11/1944 | Ellinwood | F16L 3/2235 174/135 |
| 2,404,531 | A | * | 7/1946 | Robertson | F16L 3/2235 248/68.1 |
| 3,146,982 | A | * | 9/1964 | Budnick | F16L 3/237 248/68.1 |
| 3,531,071 | A | * | 9/1970 | Kubli | F16L 3/2235 248/68.1 |
| 3,582,029 | A | * | 6/1971 | Moesta | F16L 3/222 248/68.1 |
| 3,856,244 | A | * | 12/1974 | Menshen | F16L 3/237 248/67.5 |
| 4,299,507 | A | * | 11/1981 | Collins, II | E01F 13/022 211/199 |
| 4,431,152 | A | * | 2/1984 | Reed, Jr. | H02G 3/0683 248/65 |
| 4,769,876 | A | * | 9/1988 | Platt | F16L 3/2235 24/335 |
| 4,971,268 | A | * | 11/1990 | Dobrowski | B64D 37/32 244/135 R |
| 5,060,810 | A | * | 10/1991 | Jones | A47F 7/0035 211/4 |
| 5,205,520 | A | * | 4/1993 | Walker | F16L 3/2235 248/68.1 |
| 5,261,633 | A | * | 11/1993 | Mastro | F16L 3/18 248/68.1 |
| 5,742,982 | A | * | 4/1998 | Dodd | F16G 11/00 24/16 R |
| 6,142,428 | A | * | 11/2000 | Kamata | F16L 3/1207 248/49 |
| 6,193,195 | B1 | * | 2/2001 | Owens | F16L 3/2235 248/68.1 |
| 6,561,466 | B1 | * | 5/2003 | Myers | F16L 3/221 248/68.1 |
| 6,841,021 | B1 | * | 1/2005 | Mesing | B29C 70/345 156/212 |
| 6,892,990 | B2 | * | 5/2005 | Pisczak | H02G 7/053 248/62 |
| 7,530,536 | B2 | * | 5/2009 | Hashimoto | F16L 3/2235 211/59.4 |
| 7,770,848 | B2 | * | 8/2010 | Johnson | F16L 55/035 248/65 |
| 8,348,204 | B2 | * | 1/2013 | Kataoka | B61D 49/00 248/68.1 |
| 8,602,798 | B2 | * | 12/2013 | Downing | F16L 3/1091 439/100 |
| 8,950,538 | B2 | * | 2/2015 | Kurauchi | E02F 9/0875 180/89.1 |
| 9,038,967 | B2 | * | 5/2015 | Struck | F16L 57/04 248/68.1 |
| 9,682,759 | B1 | * | 6/2017 | Huntley | B63H 20/10 |
| 10,139,015 | B2 | * | 11/2018 | VanValkenburgh | F16L 3/02 |
| 10,221,994 | B2 | * | 3/2019 | Baiera | F16L 3/006 |
| 10,348,001 | B2 | * | 7/2019 | Cayzac | F16L 3/2235 |
| 10,371,291 | B2 | * | 8/2019 | Morris | F16L 59/135 |
| 10,422,427 | B2 | * | 9/2019 | Beele | F16L 5/10 |
| 10,436,352 | B2 | * | 10/2019 | Peterson | F16L 3/2235 |
| 2003/0183413 | A1 | * | 10/2003 | Kato | H02G 3/32 174/135 |
| 2006/0249636 | A1 | * | 11/2006 | Thiedig | F16L 3/237 248/74.4 |
| 2011/0253846 | A1 | * | 10/2011 | Kataoka | H02G 3/088 248/68.1 |
| 2011/0253847 | A1 | * | 10/2011 | Kataoka | H02G 3/088 248/68.1 |
| 2012/0280092 | A1 | * | 11/2012 | Barre | F16L 3/2235 248/68.1 |
| 2013/0214100 | A1 | * | 8/2013 | Edmond | F16L 3/227 248/74.4 |
| 2017/0030487 | A1 | * | 2/2017 | Sampson | B60R 16/0215 |
| 2019/0039747 | A1 | * | 2/2019 | Gilbertson | B64D 37/32 |
| 2019/0137008 | A1 | * | 5/2019 | Peterson | F16L 3/11 |
| 2019/0145551 | A1 | * | 5/2019 | Schwalbe | F16L 3/2235 248/67.5 |
| 2019/0277364 | A1 | * | 9/2019 | Lammi | B64C 11/008 |
| 2019/0291842 | A1 | * | 9/2019 | Gilbertson | F16L 3/1083 |
| 2020/0064202 | A1 | * | 2/2020 | Newlin | F16B 2/065 |

* cited by examiner

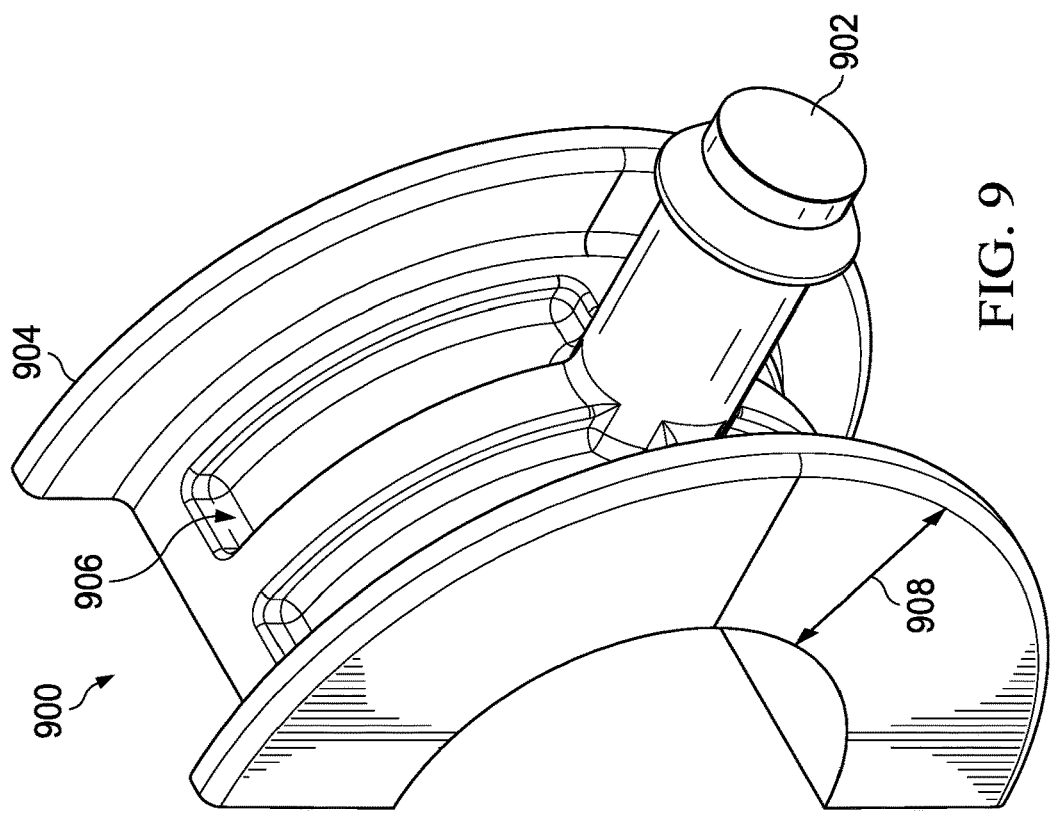
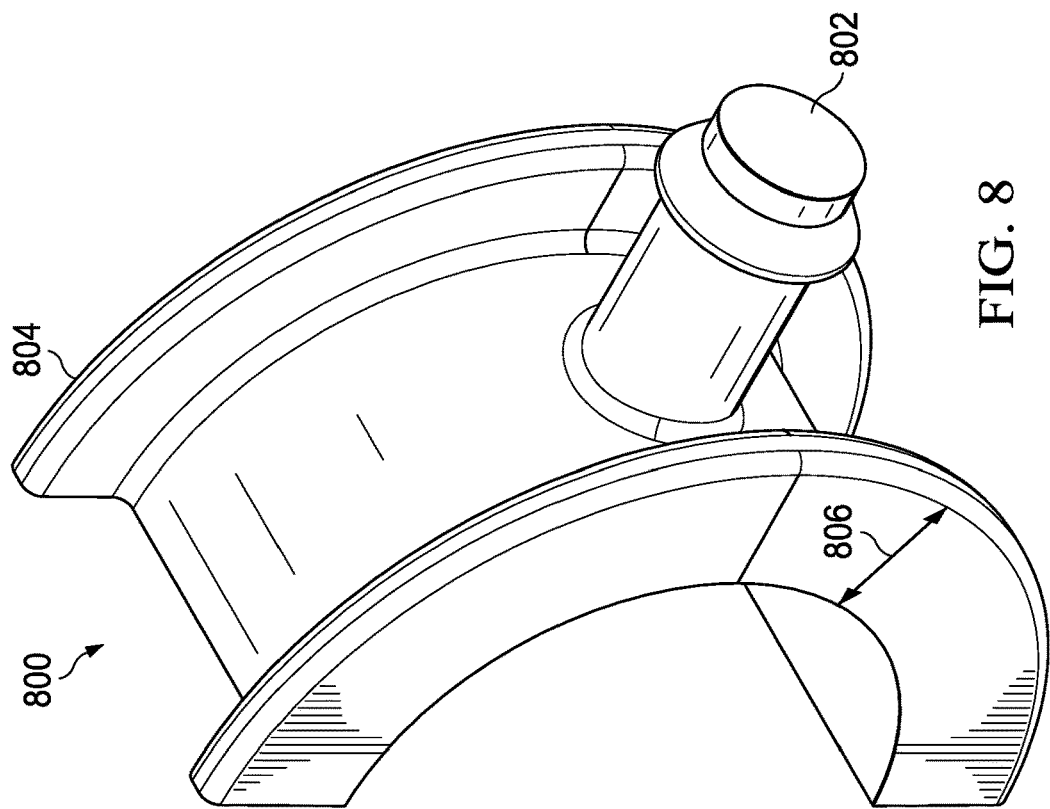

TRANSPORT ELEMENT CLAMP SYSTEM

BACKGROUND INFORMATION

1. Field

The present disclosure relates generally to transport elements for aircraft applications. More specifically, the present disclosure relates to a transport element support assembly that maintains electrical isolation between a transport element and a support structure and secures the transport element to the support structure.

2. Background

Various transport systems are used during operation of an aircraft. These transport systems may run throughout the aircraft and may be used to move fluid or electricity from one place to another. For example, transport elements may run between two support structures, eventually passing through openings in the support structures in their path. When these transport elements contain fluid, the fluid may be fuel, hydraulic fluid, or gas.

During operation, the aircraft may be exposed to electromagnetic events. To protect systems from combustion and damage, Federal Aviation Administration regulations require aircraft manufacturers to ensure that no sparking occurs in flammable zones of the aircraft. To comply with these regulations, aircraft manufacturers must ground or isolate metal objects in the flammable zones. In many cases, assemblies having electrically isolating material are installed around transport elements to prevent sparking.

These assemblies are also used to support and restrain the transport elements as they flex under the conditions of aircraft operation. To do so, an assembly bridges a gap between two support structures, holding the transport elements in place. Hundreds of these assemblies are installed in an aircraft.

A single supportive assembly may contain multiple parts, including a metal bridge and metal fasteners. Each of these parts must adhere to predetermined electromagnetic effect requirements. For instance, when metal fasteners are used to secure a metal bridge, sparking and arcing at the joint may occur during an electromagnetic event. To protect against this occurrence, aircraft manufacturers install cap seals over each of the fasteners in the assembly. Positioning, alignment, processing, and sealing fasteners for each assembly takes innumerable hours of manpower.

Therefore, it would be desirable to have a method and apparatus that takes into account at least some of the issues discussed above, as well as other possible issues.

SUMMARY

An illustrative embodiment of the present disclosure provides a transport element clamp system comprising a lower portion, an upper portion, and a channel system. The lower portion has a first number of cutouts and the upper portion has a second number of cutouts. The lower portion is configured to bridge a gap between two support structures in an aircraft. The upper portion is configured to interlock with the lower portion. The channel system is formed by the first number of cutouts and the second number of cutouts. The channel system is configured to receive a number of transport elements when the upper portion and the lower portion are coupled to each other. The transport element clamp system electrically isolates the number of transport elements from the two support structures.

Another illustrative embodiment of the present disclosure provides a method for stabilizing a transport element in an aircraft. A lower portion of a transport element clamp system is positioned in a gap between two support structures in the aircraft. A number of transport elements is positioned in a first number of cutouts in the lower portion. An upper portion of the transport element clamp system is positioned over the number of transport elements such that the number of transport elements rests in a second number of cutouts in the upper portion. The upper portion slides along the number of transport elements toward the lower portion such that the first number of cutouts and the second number of cutouts surround a periphery of each of the number of transport elements. The upper portion is secured to the lower portion such that the transport element clamp system electrically isolates the number of transport elements from a first support structure and a second support structure.

A further illustrative embodiment of the present disclosure provides an aircraft comprising support structures, a number of transport elements, and a transport element clamp system. The number of transport elements run parallel to the support structures within a gap between the support structures. The transport element clamp system comprises a lower portion having a first number of cutouts, an upper portion having a second number of cutouts, and a channel system. The lower portion is configured to bridge the gap between the support structures. The upper portion is configured to interlock with the lower portion. The channel system is formed by the first number of cutouts and the second number of cutouts. The channel system is configured to receive the number of transport elements. The transport element clamp system electrically isolates the number of transport elements from the support structures.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 is an illustration of a portion of an insert in accordance with an illustrative embodiment;

FIG. 9 is another illustration of a portion of an insert in accordance with an illustrative embodiment;

DETAILED DESCRIPTION

The illustrative embodiments recognize and take into account one or more different considerations. For example, the illustrative embodiments recognize and take into account that the manufacturing process for electrically isolating and supporting transport elements in aircraft is often more expensive and time consuming than desired. Current solutions employ a metal intercostal attached to stringer brackets, bridging the gap between two support structures. The intercostal is secured with metal fasteners, each of which must be cap sealed to prevent arcing and sparking. An additional fitting is used to support and restrain a transport element within its surrounding structure.

Manually aligning and connecting multi-piece, complicated fittings takes significant assembly time. Moreover, each part of an assembly must adhere to specific electromagnetic effect requirements. The cap sealing process extends manufacturing time as each fastener must receive a cap seal on the top and on the bottom of the stack up. As a result, it may take more time than desired to design, manufacture, and implement these parts.

The disclosed embodiments relate to a transport element clamp system that combines electromagnetic isolation and structural support without the need for the cap sealing process. The embodiments can be used in a wide variety of aircraft applications for stabilizing and protecting transport systems from electromagnetic effects.

Figure 1:
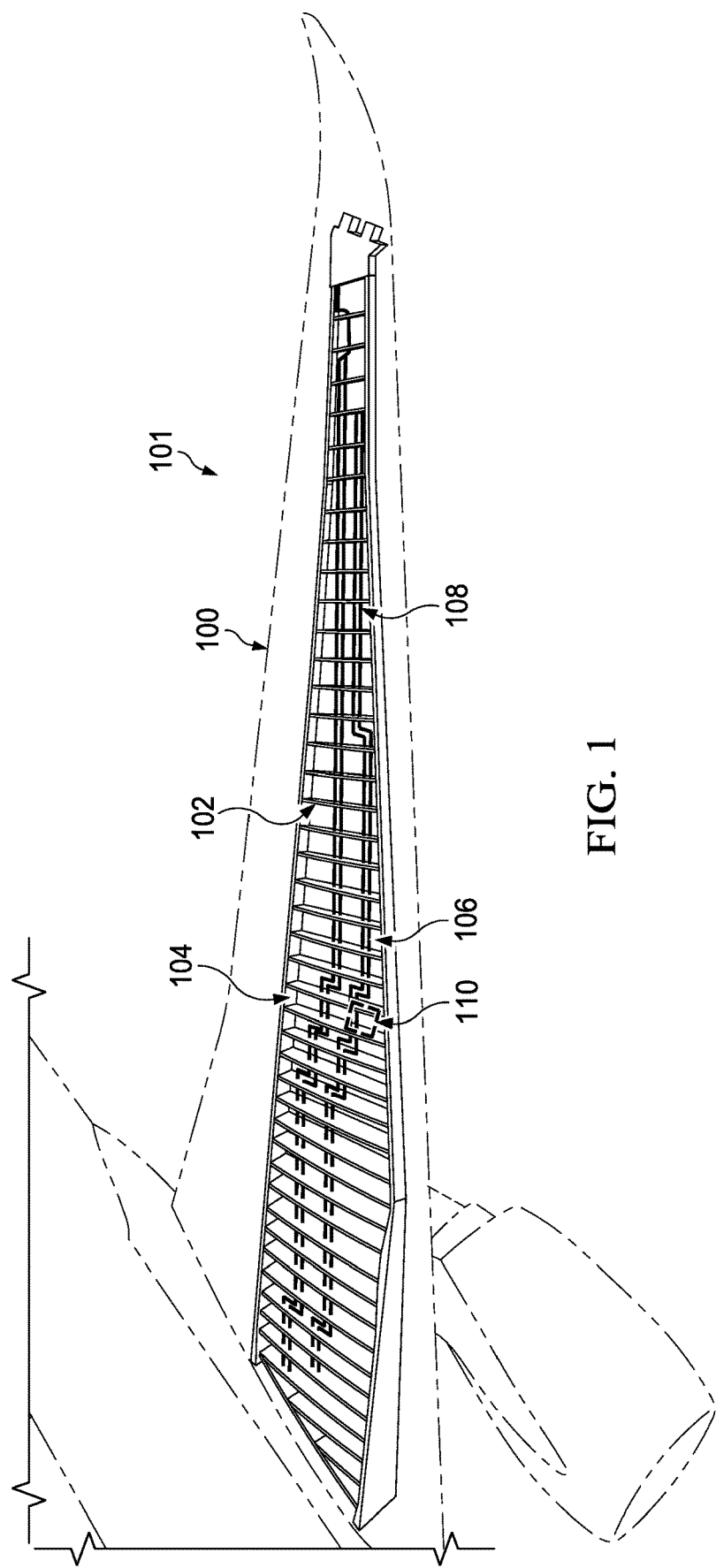
FIG. 1 is an illustration of a perspective view of a wing of an aircraft in accordance with an illustrative embodiment.

With reference now to the figures and, in particular, with reference to FIG. 1, an illustration of a perspective view of a wing of an aircraft is depicted in accordance with an illustrative embodiment. Wing 100 in aircraft 101 has ribs 102 and stringers 104. Transport system 106 runs through wing 100. Transport system 106 has transport elements 108. Transport elements 108 carry fluid through wing 100 in this illustrative example. In other illustrative examples, transport elements 108 may carry electricity or some other medium.

Transport elements 108 pass between stringers 104. In this illustrative example, transport elements 108 run parallel to stringers 104. At various locations along stringers 104, transport elements 108 may be secured to stringers 104 using transport element clamp systems (not shown in this view). Each transport element clamp system provides electrical isolation between transport elements 108 and stringers 104. The transport element clamp systems also provide structural support to hold transport elements 108 in place.

Section 110 of wing 100 shows a portion of transport system 106. Components in section 110 are shown in greater detail in FIG. 10.

Figure 2:
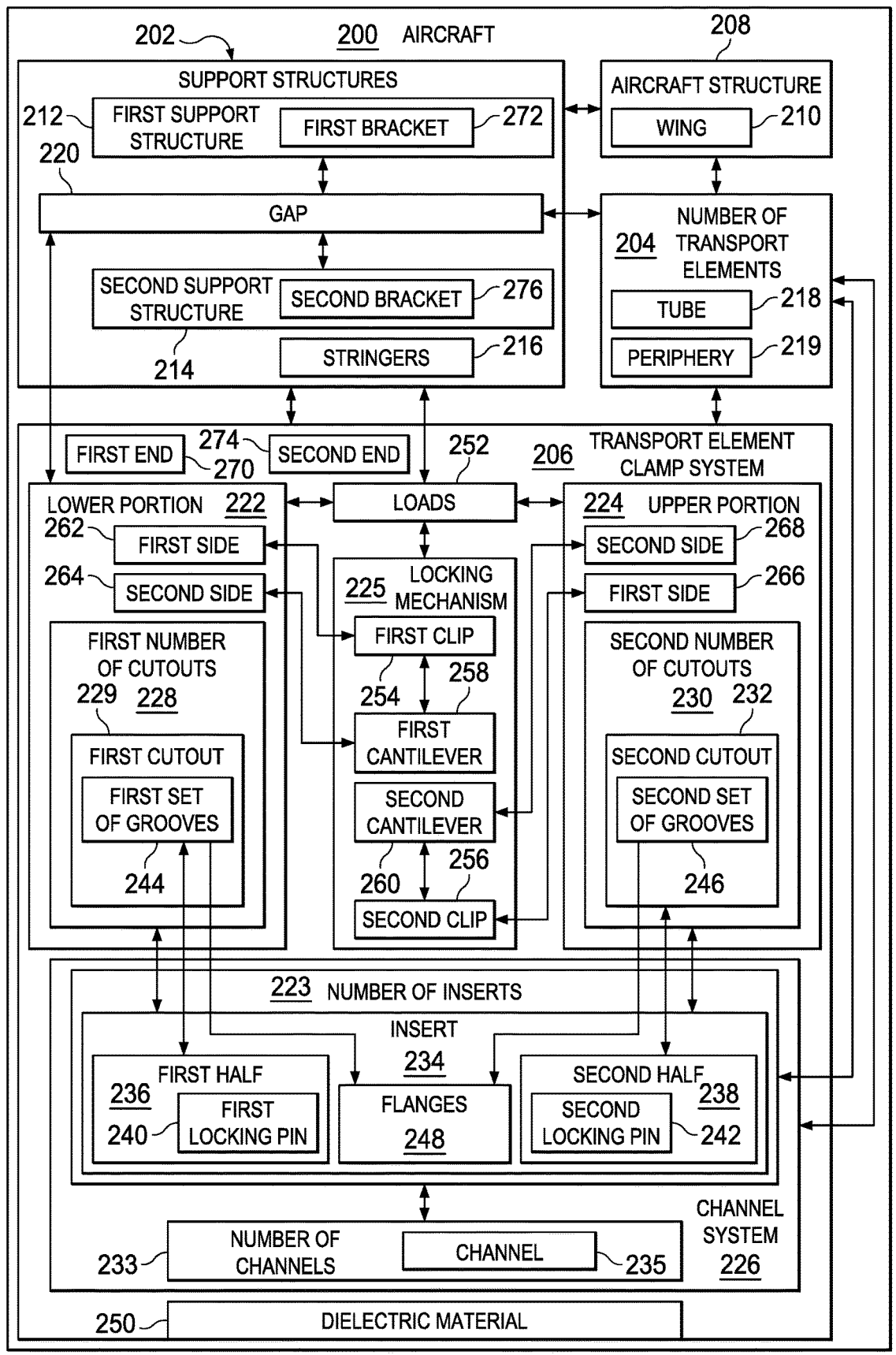
FIG. 2 is an illustration of a block diagram of an aircraft in accordance with an illustrative embodiment.

Turning now to FIG. 2, an illustration of a block diagram of an aircraft is depicted in accordance with an illustrative embodiment. Aircraft 200 comprises support structures 202, number of transport elements 204, and transport element clamp system 206.

As used herein, "a number of" when used with reference to items means one or more items. Thus, a number of transport elements include one or more transport elements.

As depicted, support structures 202 may provide structural support for aircraft structure 208. Aircraft structure 208 may be any type of aerospace structure through which number of transport elements 204 pass.

Aircraft structure 208 may take the form of wing 210 in this illustrative example. In other illustrative examples, aircraft structure 208 may be an engine nacelle, a muffler, a panel, a compartment, a housing, a tank, a cabin, a waste system, a portion of a fuselage, or any other type of aerospace structure where transport element clamp system 206 may be used.

Support structures 202 include first support structure 212 and second support structure 214. Support structures 202 take the form of stringers 216 in this illustrative example. In other examples, support structures 202 may take the form of a rib, a spar, or some other type of support structure.

Each of number of transport elements 204 is configured to move a medium from one place in aircraft 200 to another. That medium may take the form of, for example, without limitation, a fluid, fuel, hydraulic fluid, electricity, or some other medium.

When fluid flows through number of transport elements 204, each of transport elements 204 takes the form of tube 218. Tube 218 may have varying sizes depending on the medium being transported. Tube 218 has periphery 219. The shape, size, diameter, wall thickness, and material for tube 218 may be selected to comply with aircraft regulations or manufacturing specifications, depending on the type of fluid flowing through tube 218.

In this illustrative example, number of transport elements 204 run parallel to support structures 202 within gap 220 between support structures 202. Transport element clamp system 206 is used to stabilize number of transport elements 204 between support structures 202. Transport element clamp system 206 electrically isolates number of transport elements 204 from support structures 202 as well.

Electrical isolation is desirable to prevent sparking from electromagnetic effects. Electromagnetic effects may result from an electromagnetic event such as a lightning strike or other electromagnetic event during operation of aircraft 200.

As depicted, transport element clamp system 206 comprises lower portion 222, number of inserts 223, upper portion 224, locking mechanism 225, and channel system 226. Lower portion 222 is configured to bridge gap 220 between support structures 202. Upper portion 224 is configured to interlock with lower portion 222.

Upper portion 224 and lower portion 222 are interchangeable in this illustrative example. In other words, upper portion 224 and lower portion 222 are identical parts. All features and functions of upper portion 224 and lower portion 222 are substantially uniform.

In this illustrative example, lower portion 222 has first number of cutouts 228. Upper portion 224 has second number of cutouts 230. First number of cutouts 228 are holes or indentations formed in lower portion 222. Second number of cutouts 230 are holes or indentations formed in upper portion 224. First number of cutouts 228 and second number of cutouts 230 are formed at a desired depth and shape. First cutout 229 is one of first number of cutouts 228. Cutout 232 is one of second number of cutouts 230.

Each one of first number of cutouts 228 corresponds to one of second number of cutouts 230 when lower portion 222 and upper portion 224 are coupled to each other. For example, first cutout 229 corresponds to cutout 232 in this illustrative example.

Channel system 226 is formed by first number of cutouts 228 and second number of cutouts 230. Channel system 226 is configured to receive number of transport elements 204 when upper portion 224 and lower portion 222 are coupled to each other. Channel system 226 has number of channels 233. Channel 235 in number of channels 233 is formed by first cutout 229 in lower portion 222 and second cutout 232 in upper portion 224 when the two pieces are coupled together.

In this illustrative example, number of inserts 223 is positioned within channel system 226. Insert 234 in number of inserts 223 is positioned in one of number of channels 233. In some cases, when more than one channel is formed, insert 234 in number of inserts 223 is positioned in each channel in number of channels 233. In other examples, some of number of channels 233 may not have an insert. Number of inserts 223 is configured to stabilize number of transport elements 204 in this illustrative example.

As depicted, each insert in number of inserts 223 has two parts. As an example, insert 234 in number of inserts 223 has first half 236 and second half 238. First half 236 and second half 238 may be interchangeable in this illustrative example. In other illustrative examples, first half 236 and second half 238 of insert 234 may have different features from one another.

First half 236 is positioned within first cutout 229 in lower portion 222. Second half 238 is positioned within second cutout 232 in upper portion 224. First half 236 and second half 238 correspond to surround periphery 219 of a transport element in number of transport elements 204 to stabilize the transport element.

First locking pin 240 is configured to hold first half 236 of insert 234 in place during operation of aircraft 200. Second locking pin 242 is configured to hold second half 238 in insert 234 in place during operation of aircraft 200.

In this illustrative example, first half 236 of insert 234 is secured to lower portion 222 by first locking pin 240. For example, without limitation, a hole may be cut through lower portion 222 and first locking pin 240 may be interference fit with the hole such that first half 236 of insert 234 remains in a desired position during use of aircraft 200.

In the same manner, second half 238 of insert 234 is secured to upper portion 224 by second locking pin 242. In other illustrative examples, first half 236, second half 238, or both may be secured in some other manner, depending on the particular implementation. For example, a clip, an adhesive, or some other mechanism may be used. In other illustrative examples, first half 236 of insert 234 may be formed as part of lower portion 222 and second half 238 of insert 234 may be formed as part of upper portion 224.

As depicted, first set of grooves 244 is formed within first cutout 229. Second set of grooves 246 is formed within second cutout 232. First set of grooves 244 and second set of grooves 246 are depressions cut into first cutout 229 and second cutout 232, respectively. First set of grooves 244 is configured to guide installation and receive corresponding flanges in first half 236 of insert 234. Second set of grooves 246 is configured to guide installation and receive corresponding flanges in second half 238 of insert 234. In this manner, insert 234 has flanges 248 configured to be engaged with at least one of first set of grooves 244 or second set of grooves 246.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

In this illustrative example, lower portion 222, upper portion 224, and insert 234 are comprised of dielectric material 250. Dielectric material 250 may be comprised of a material selected from at least one of a thermoplastic material, a thermoset material, acetal homopolymer, nylon, polytetrafluoroethylene, polyamide-imide, graphite, carbon fiber reinforced plastic, melamine, phenolic and other resins (with or without reinforcing fibers), polyetheretherketone (PEEK), polyetherketoneketone (PEKK), rubber, or some other suitable electrically isolating material. In some cases, lower portion 222, upper portion 224, and insert 234 may be comprised of the same material. In other examples, one or more of these parts may be comprised of different types of materials than the others.

Locking mechanism 225 is a structure or a number of structures configured to secure lower portion 222 to upper portion 224 such that lower portion 222 and upper portion 224 share loads 252 placed on transport element clamp system 206 during operation of aircraft 200. With the use of locking mechanism 225, lower portion 222 and upper portion 224 may share loads 252 equally in some cases. Locking mechanism 225 may comprise a number of structures on both lower portion 222 and upper portion 224 that work to couple the two pieces together.

In this illustrative example, locking mechanism 225 comprises first clip 254, second clip 256, first cantilever 258, and second cantilever 260. First clip 254 is located on first side 262 of lower portion 222. First cantilever 258 is located on second side 264 of lower portion 222. Second clip 256 is located on first side 266 of upper portion 224 and second cantilever 260 is located on second side 268 of upper portion 224.

As depicted, second clip 256 is configured to engage with first cantilever 258. Second cantilever 260 is configured to engage with first clip 254. This combination interlocks lower portion 222 and upper portion 224 of transport element clamp system 206 together.

When transport element clamp system 206 is installed in aircraft 200, first end 270 of transport element clamp system 206 is fastened to first bracket 272 on first support structure 212. In a similar manner, second end 274 of transport element clamp system 206 is fastened to second bracket 276 on second support structure 214.

With an illustrative embodiment, manufacturing and installation of transport element clamp system 206 may take less time than with currently used systems. Transport element clamp system 206 is both a clamp and a bracket that provides electromagnetic isolation and support for number of transport elements 204 in one mechanism. Because all parts in transport element clamp system 206 are comprised of dielectric material 250, any fasteners used to secure transport element clamp system 206 to support structures 202 do not need to be cap sealed. As a result, the use of transport element clamp system 206 saves manufacturing time, decreases cost, and provides an assembly with interchangeable pieces for ease of manufacturing.

Figure 3:
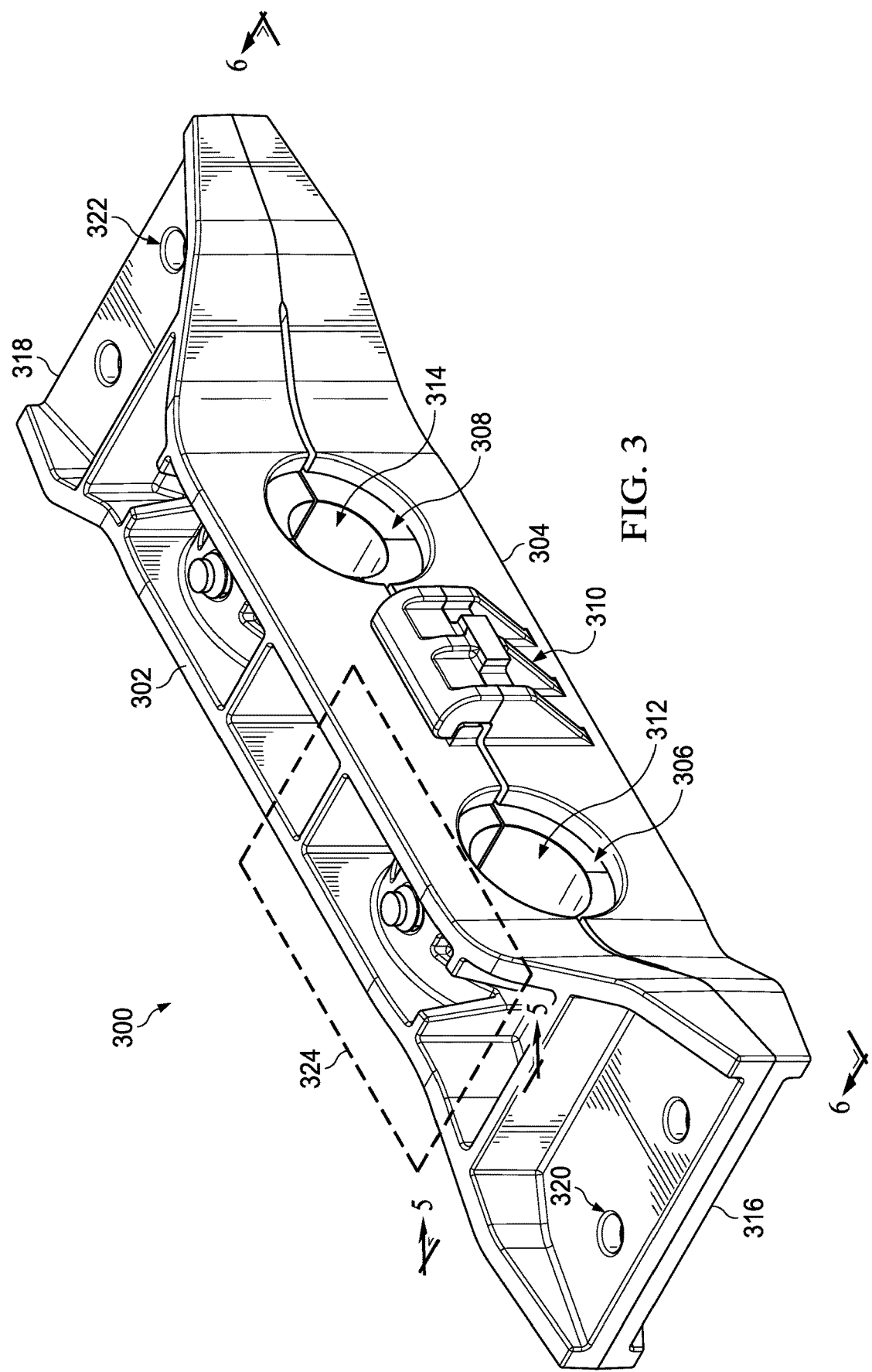
FIG. 3 is an illustration of a perspective view of a transport element clamp system in accordance with an illustrative embodiment.

With reference next to FIG. 3, an illustration of a perspective view of a transport element clamp system is depicted in accordance with an illustrative embodiment. FIG. 3 depicts an example of one implementation for transport element clamp system 206 shown in block form in FIG. 2.

As depicted, transport element clamp system 300 has upper portion 302, lower portion 304, insert 306, insert 308, and locking mechanism 310. FIG. 3 depicts transport element clamp system 300 in the locked position. In other words, upper portion 302 and lower portion 304 interface securely with one another. Locking mechanism 310 secures upper portion 302 to lower portion 304. Another locking mechanism (not shown in this view) is located on the opposite side of locking mechanism 310.

Channel 312 and channel 314 are also shown in this view. Insert 306 is shaped such that channel 312 is formed. Insert 308 is shaped such that channel 314 is formed. A transport element (not shown in this view) may pass through channel 312, channel 314, or both. Although channel 312 and channel 314 are shown as having a circular shape, other shapes are possible, depending on how insert 306 and insert 308, respectively, are formed.

Transport element clamp system 300 fills the gap between two stringers. In this illustrative example, transport element clamp system 300 has first end 316 and second end 318. When installed in an aircraft, first end 316 is fastened to a bracket on a first stringer using holes 320. Second end 318 is fastened to a bracket on a second stringer using holes 322. Holes 320 and holes 322 each have two holes in this illustrative example, but other numbers of holes are possible.

Section 324 shows a portion of transport element clamp system 300. Components in section 324 are shown in greater detail in FIG. 5.

Figure 4:
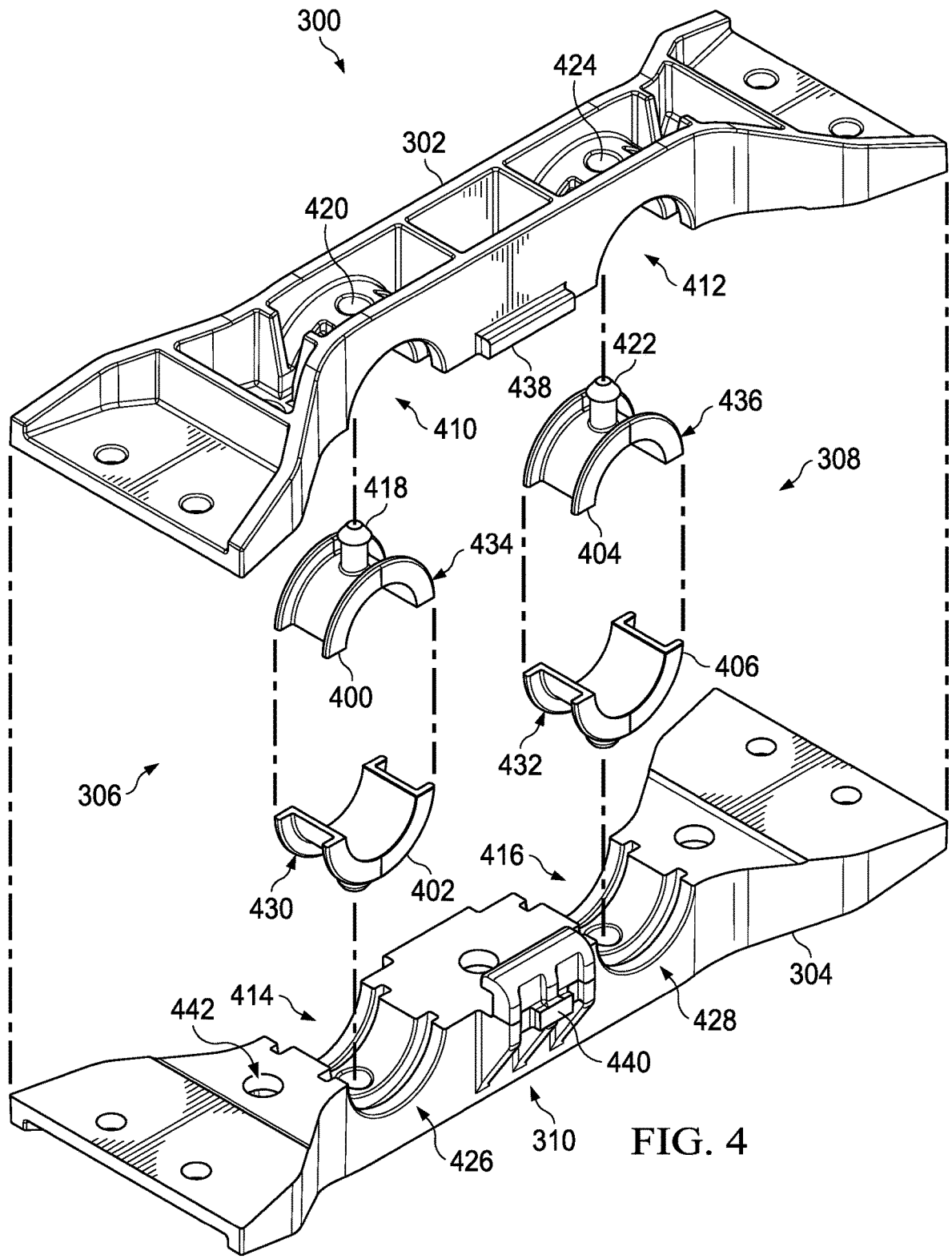
FIG. 4 is an illustration of an exploded view of a transport element clamp system in accordance with an illustrative embodiment.

Turning now to FIG. 4, an illustration of an exploded view of a transport element clamp system is depicted in accordance with an illustrative embodiment. As shown in this view, insert 306 has first half 400 and second half 402. Insert 308 has first half 404 and second half 406.

In this illustrative example, upper portion 302 has cutout 410 and cutout 412. Lower portion 304 has cutout 414 and cutout 416. Each cutout receives a half of an insert in this illustrative example. For example, cutout 410 receives first half 400 of insert 306 and cutout 414 receives second half 402 of insert 306. Cutout 412 receives first half 404 of insert 308 and cutout 416 receives second half 406 of insert 308.

To secure first half 400 of insert 306 to upper portion 302, locking pin 418 is interference fit with hole 420 in upper portion 302. To secure first half 404 of insert 308 to upper portion 302, locking pin 422 is interference fit with hole 424 in upper portion 302. Second half 402 of insert 306 and second half 406 of insert 308 may be secured to lower portion 304 in a similar manner.

As depicted, cutout 414 has grooves 426. Cutout 416 has grooves 428. Flanges 430 in second half 402 of insert 306 engage with grooves 426 when second half 402 of insert 306 is installed in lower portion 304. Flanges 432 in second half 406 of insert 308 engage with grooves 428 when second half 406 of insert 308 is installed in lower portion 304.

In this illustrative example, first half 400 of insert 306 has flanges 434 and first half 404 of insert 308 has flanges 436. Flanges 434 engage with grooves (not shown in this view) in cutout 410 and flanges 436 engage with grooves (not shown in this view) in cutout 412 in a similar manner as described above.

Transport element clamp system 300 has a locking mechanism on both sides. In this illustrative example, locking mechanism 310 has cantilever 438 and clip 440. Cantilever 438 snaps into clip 440 to couple upper portion 302 to lower portion 304.

In this view, a number of drainage holes 442 may be seen on lower portion 304. Drainage holes 442 may be formed along each portion of the bracket. Drainage holes 442 are configured to prevent trapping of water that could freeze and damage parts within transport element clamp system 300. In addition, drainage holes 442 may drain fuel to minimize the amount of trapped unused fuel in the assembly. Corresponding drainage holes are present on upper portion 302 (not shown in this view) such that fluid can move through transport element clamp system 300 as a whole.

Figure 5:
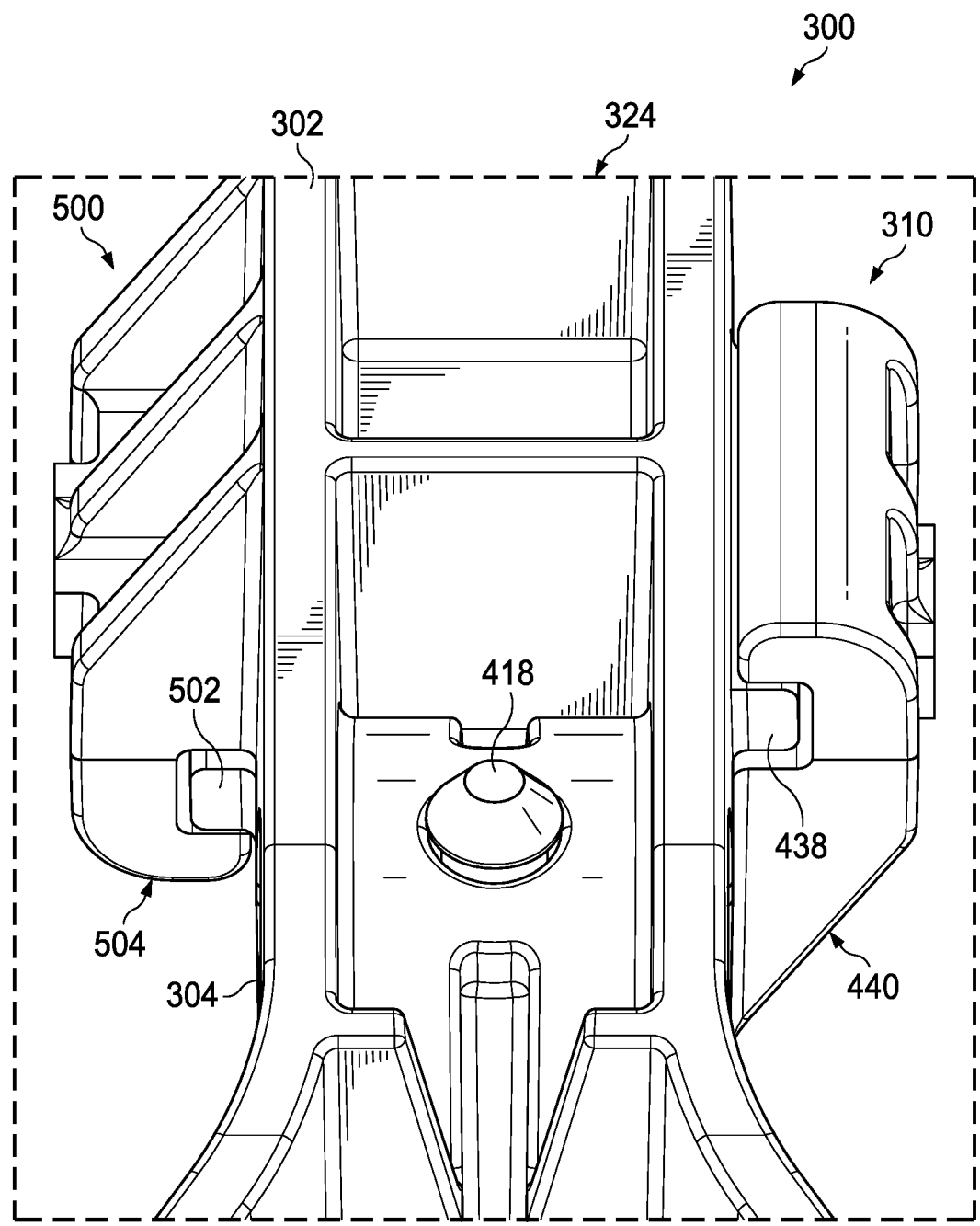
FIG. 5 is an illustration of a section of a transport element clamp system in accordance with an illustrative embodiment.

With reference now to FIG. 5, an illustration of a section of a transport element clamp system is depicted in accordance with an illustrative embodiment. FIG. 5 depicts a more-detailed view of section 324 of transport element clamp system 300 shown in the direction of view lines 5-5 in FIG. 3.

Locking mechanism 310 is shown with cantilever 438 engaged with clip 440. On the other side of transport element clamp system 300, locking mechanism 500 also locks upper portion 302 to lower portion 304. Locking mechanism 500 has cantilever 502 and clip 504. Cantilever 502 snaps into clip 504 to further secure upper portion 302 to lower portion 304.

In some illustrative examples, small gaps may be present between upper portion 302 and lower portion 304 when coupled together. Such gaps allow for manufacturing tolerances, warpage, and for ease of assembly without preload.

Figure 6:
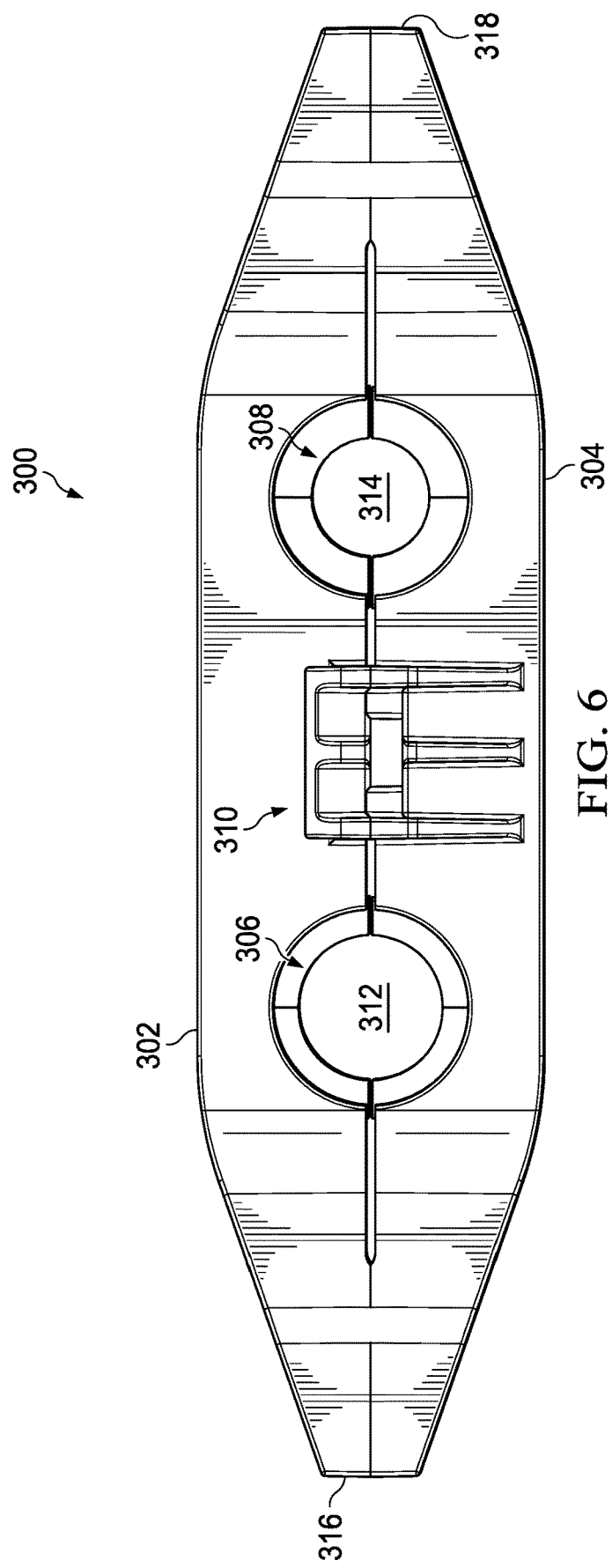
FIG. 6 is an illustration of a front view of a transport element clamp system in accordance with an illustrative embodiment.

Turning next to FIG. 6, an illustration of a front view of a transport element clamp system is depicted in accordance with an illustrative embodiment. Transport element clamp system 300 is shown in the direction of view lines 6-6 in FIG. 3.

Inserts in various embodiments can be tailored to fit the needs of different types of transport elements. As shown in this view, insert 306 is thinner than insert 308, thus making channel 312 larger in diameter than channel 314. In this manner, channel 312 is configured to hold a larger transport element than channel 314. In other illustrative examples, both insert 306 and insert 308 may have substantially the same thickness. Inserts with similar thicknesses may be configured to hold the same or different types of transport elements, depending on the needs of the aircraft.

Figure 7:
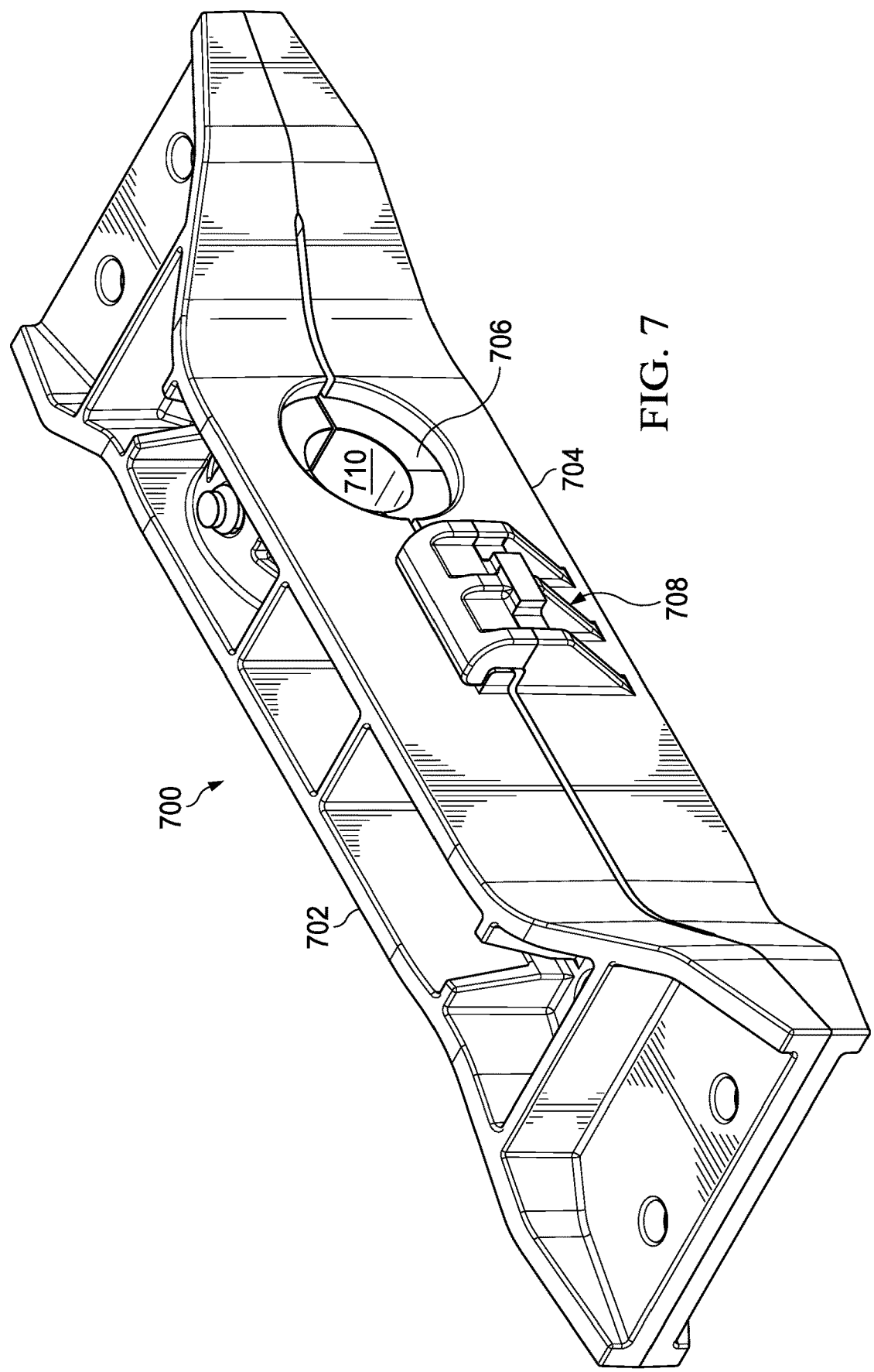
FIG. 7 is an illustration of a transport element clamp system in accordance with an illustrative embodiment.

In FIG. 7, an illustration of a transport element clamp system is depicted in accordance with an illustrative embodiment. FIG. 7 depicts an alternative implementation of transport element clamp system 206 shown in block form in FIG. 2. Transport element clamp system 700 is configured to electrically isolate and support only one transport element in this illustrative example.

As depicted, transport element clamp system 700 has upper portion 702, lower portion 704, insert 706, and locking mechanism 708. Channel 710 is formed by insert 706.

FIG. 8 and FIG. 9 show two different configurations for a portion of an insert. Insert half 800 in FIG. 8 comprises locking pin 802 and flanges 804. Insert half 900 in FIG. 9 comprises locking pin 902, flanges 904, and grooves 906. Grooves 906 may be formed in insert half 900 to minimize wall thickness which in turn minimizes warping and deformation as the part cools. Grooves 906 also may decrease the weight of the part. Thickness 908 of insert half 900 in FIG. 9 is greater than thickness 806 of insert half 800 in FIG. 8 in these illustrative examples.

Figure 10:
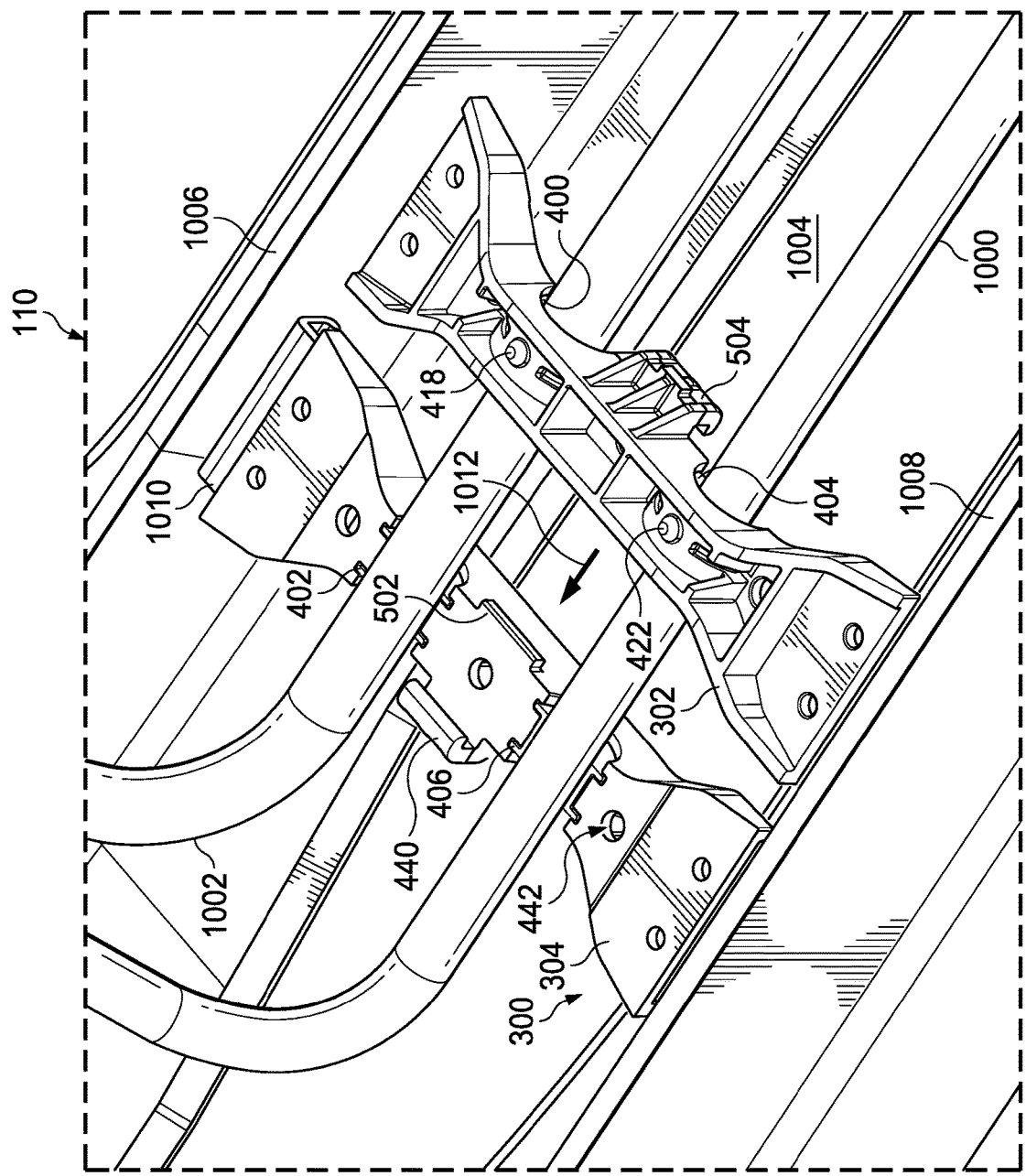
FIG. 10 is an illustration of a section of an aircraft showing components of a transport element clamp system in accordance with an illustrative embodiment.

Turning next to FIG. 10, an illustration of a section of an aircraft showing components of a transport element clamp system is depicted in accordance with an illustrative embodiment. FIG. 10 shows a more-detailed view of section 110 from FIG. 1 with the components in transport element clamp system 300 from FIG. 3 and FIG. 4 installed in wing 100 of aircraft 101.

As illustrated, transport element 1000 and transport element 1002 run through gap 1004 between stringer 1006 and stringer 1008. Lower portion 304 has been positioned on bracket 1010 on stringer 1006 and a bracket (not shown in this view) on stringer 1008.

Inserts have already been installed in upper portion 302 and lower portion 304 of transport element clamp system 300. Transport element 1000 has been positioned in second half 406 of insert 308. Transport element 1002 has been positioned within second half 402 of insert 306.

Upper portion 302 of transport element clamp system 300 rests on transport element 1000 and transport element 1002. Upper portion 302 is slid in the direction of arrow 1012 to couple upper portion 302 and lower portion 304 together.

Figure 11:
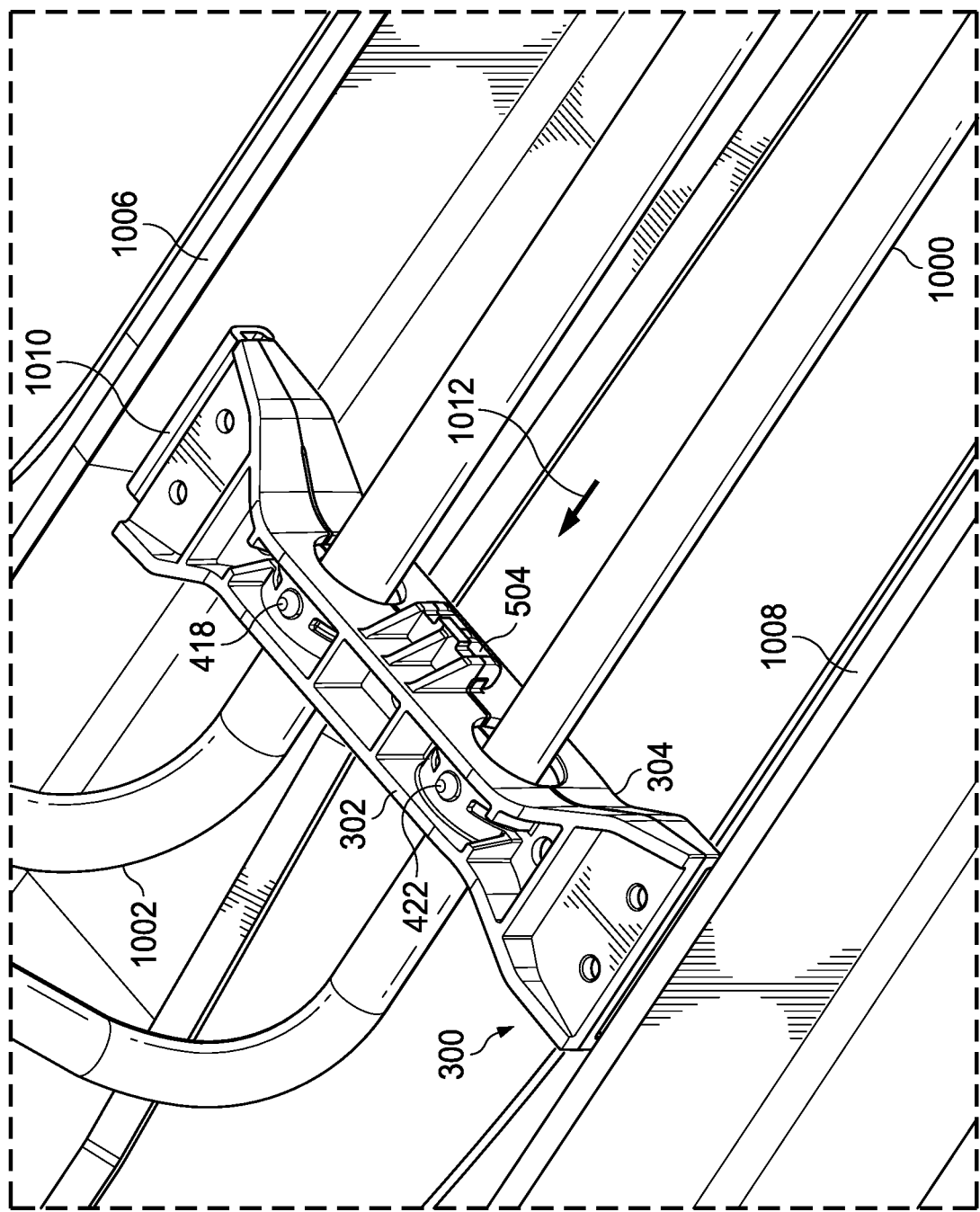
FIG. 11 is another illustration of a section of an aircraft showing components of a transport element clamp system in accordance with an illustrative embodiment.

With reference now to FIG. 11, an illustration of a section of an aircraft showing components of a transport element clamp system is depicted in accordance with an illustrative embodiment. In this example, upper portion 302 has been slid in the direction of arrow 1012 to snap into place. Now, fasteners can be used to secure transport element clamp system 300 as a whole to stringer 1006 and stringer 1008. These fasteners do not need separate electromagnetic isolation.

Wing 100 in FIG. 1 is only one physical implementation of a platform incorporating transport element clamp system 206 in FIG. 2. Although the examples for an illustrative embodiment are described with respect to an aircraft, an illustrative embodiment may be applied to other types of platforms. Transport element clamp system 206 in FIG. 2 may be used in any platform where tubing or wires are present. The platform may be, for example, a mobile platform, a stationary platform, a land-based structure, an aquatic-based structure, or a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, and other suitable platforms.

The different components shown in FIG. 1 and FIGS. 3-11 may be combined with components in FIG. 2, used with components in FIG. 2, or a combination of the two. Additionally, some of the components in FIG. 1 and FIGS. 3-9 may be illustrative examples of how components shown in block form in FIG. 2 may be implemented as physical structures.

Other configurations of transport element clamp system 300 may be implemented other than those shown in FIGS. 3-9. For example, a transport element clamp system may have one, two, three, or more insert locations for transport elements. Such insert locations may be spaced in a desired manner along a bracket.

Figure 12:
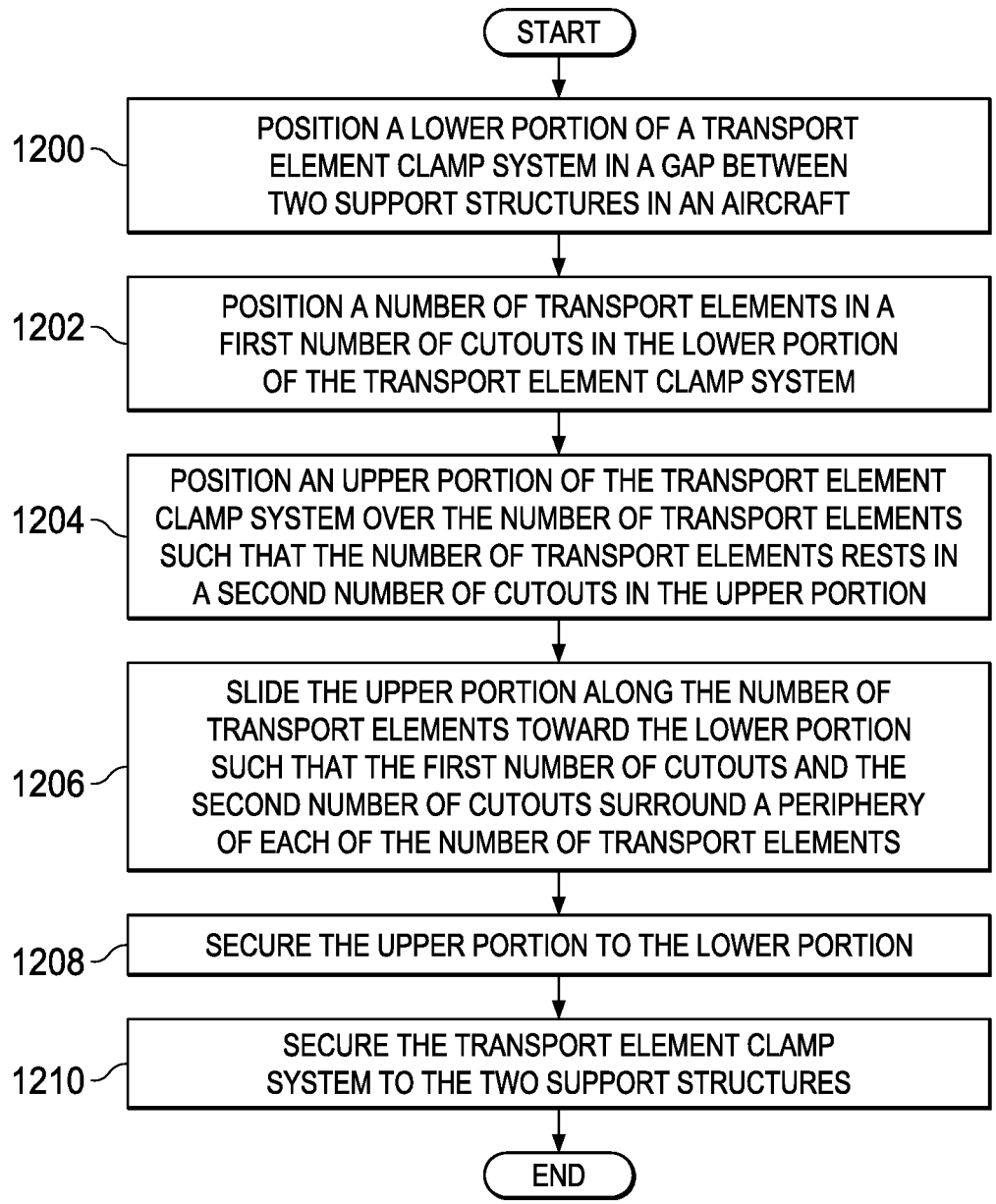
FIG. 12 is an illustration of a flowchart of a process for stabilizing a transport element in an aircraft in accordance with an illustrative embodiment.

With reference next to FIG. 12, an illustration of a flowchart of a process for stabilizing a transport element in an aircraft is depicted in accordance with an illustrative embodiment. The method depicted in FIG. 12 may be used to install transport element clamp system 206 shown in FIG. 2.

The process begins by positioning a lower portion of a transport element clamp system in a gap between two support structures in an aircraft (operation 1200). Next, a number of transport elements is positioned in a first number of cutouts in the lower portion of the transport element clamp system (operation 1202).

The process then positions an upper portion of the transport element clamp system over the number of transport elements such that the number of transport elements rests in a second number of cutouts in the upper portion (operation 1204). The upper portion is slid along the number of transport elements toward the lower portion such that the first number of cutouts and the second number of cutouts surround a periphery of each of the number of transport elements (operation 1206).

Once the two pieces interface each other, the upper portion is secured to the lower portion (operation 1208). The transport element clamp system is then secured to the two support structures (operation 1210), with the process terminating thereafter. This process can be repeated to install each transport element clamp system in the aircraft.

A transport element clamp system in accordance with an illustrative embodiment may be installed in a different manner than described herein. For example, the transport element clamp system may be installed around already present transport elements during manufacturing of the aircraft or to replace existing support assemblies in the aircraft.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

Figure 13:
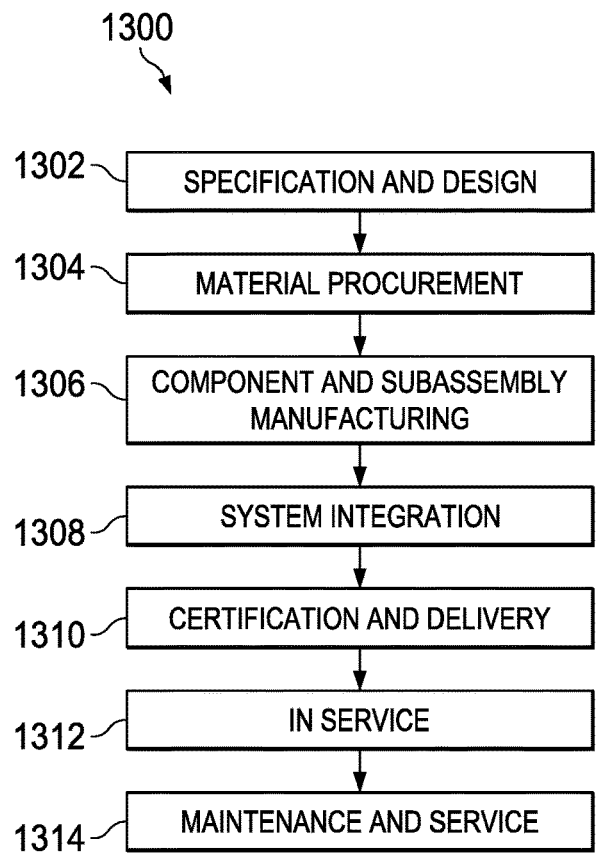
FIG. 13 is an illustration of a block diagram of an aircraft manufacturing and service method in accordance with an illustrative embodiment.
Figure 14:
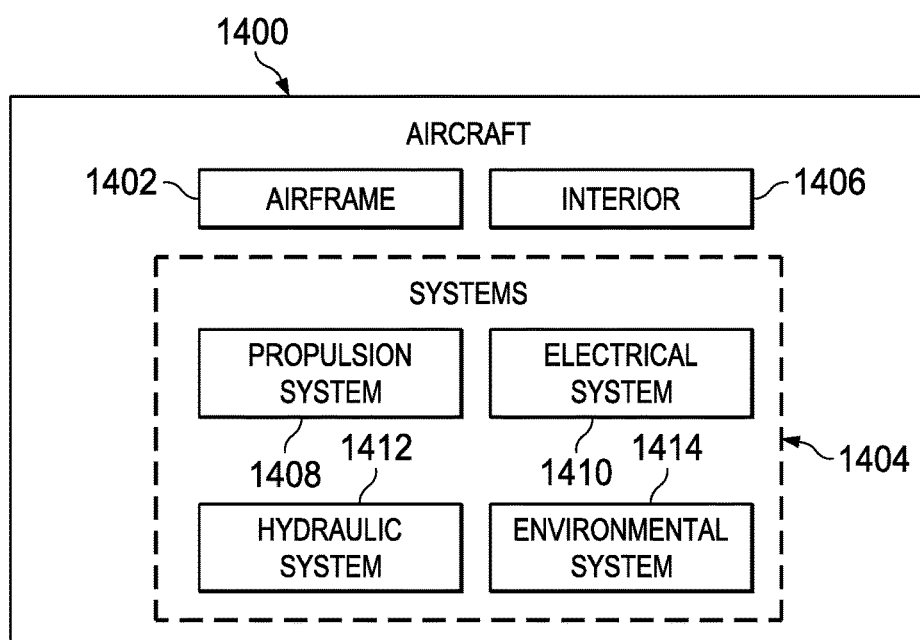
FIG. 14 is an illustration of a block diagram of an aircraft in which an illustrative embodiment may be implemented.

Illustrative embodiments of the disclosure may be described in the context of aircraft manufacturing and service method 1300 as shown in FIG. 13 and aircraft 1400 as shown in FIG. 14. Turning first to FIG. 13, an illustration of a block diagram of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Transport element clamp system 206 from FIG. 2 and the components within transport element clamp system 206 may be made during component and subassembly manufacturing 1306. In addition, transport element clamp system 206 may be used in parts made for routine maintenance and service 1314 as part of a modification, reconfiguration, or refurbishment of aircraft 1400 in FIG. 14.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of a block diagram of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13.

In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 in FIG. 13, or both. The use of a number of the different illustrative embodiments may substantially expedite the assembly of aircraft 1400, reduce the cost of aircraft 1400, or both expedite the assembly of aircraft 1400 and reduce the cost of aircraft 1400.

The illustrative embodiments decrease aircraft manufacturing and installation time. A transport element clamp system provides electromagnetic isolation and support for a transport element. Because all components within the transport element clamp system are made of a dielectric material, there is no risk of arching and sparking. As a result, the need for cap sealing fasteners can be reduced or eliminated, saving time and cost.

Since the lower portion and the upper portion of the transport element clamp system are interchangeable, the components can be mass produced and quickly installed. The locking mechanism allows both portions to share loads applied to the transport element clamp system during operation of the aircraft, reducing the risk of failure.

This design for a transport element clamp system may be used to support and electrically isolate different types of transport elements by using different inserts. For instance, a thinner insert may be used to support a larger tube. In this manner, the illustrative embodiments provide a completely customizable clamp system for aircraft applications.

The illustrative embodiments eliminate some of the components previously used to isolate and secure tubing. Further, the illustrative embodiments eliminate the need for each of the components to have separate electromagnetic effect protection. Electromagnetic isolation is achieved from transport element clamp system 206 in FIG. 2 alone.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A transport element clamp system comprising:
    a lower portion having a first number of cutouts and configured to bridge a gap between two support structures in an aircraft;
    an upper portion having a second number of cutouts and configured to interlock with the lower portion;
    a channel system formed by the first number of cutouts and the second number of cutouts, wherein the channel system is configured to receive a number of transport elements when the upper portion and the lower portion are coupled to each other;
    a number of inserts positioned within the channel system configured to be in contact with the number of transport elements and configured to stabilize the number of transport elements;
    wherein an insert of the number of inserts comprises a first half positioned within a first cutout of the first number of cutouts in the lower portion and a second half positioned within a second cutout of the second number of cutouts in the upper portion, wherein the first half and the second half surround a periphery of a transport element;
    wherein the first half of the insert is secured to the lower portion by a first locking pin and the second half of the insert is secured to the upper portion by a second locking pin; and
    wherein the transport element clamp system is configured to electrically isolate the number of transport elements from the two support structures.

2. The transport element clamp system of claim 1, wherein the upper portion and the lower portion are interchangeable.

3. The transport element clamp system of claim 1 further comprising:
    a first set of grooves formed within the first cutout; and
    a second set of grooves formed within the second cutout.

4. The transport element clamp system of claim 3, wherein the insert has flanges configured to engage with at least one of the first set of grooves or the second set of grooves.

5. The transport element clamp system of claim 1, wherein the lower portion, the upper portion, and the insert of the number of inserts are comprised of a dielectric material.

6. The transport element clamp system of claim 1 further comprising:
a locking mechanism configured to secure the lower portion to the upper portion such that the lower portion and the upper portion share loads placed on the transport element clamp system during operation of the aircraft.

7. The transport element clamp system of claim 6, wherein the locking mechanism comprises:
a first clip on a first side of the lower portion;
a first cantilever on a second side of the lower portion;
a second clip on a first side of the upper portion configured to engage with the first cantilever on the second side of the lower portion; and
a second cantilever on a second side of the upper portion configured to engage with the first clip on the first side of the lower portion.

8. A method for stabilizing a transport element in an aircraft, the method comprising:
positioning a lower portion of a transport element clamp system in a gap between two support structures in the aircraft;
positioning a number of transport elements in a first number of cutouts in the lower portion;
positioning an upper portion of the transport element clamp system over the number of transport elements such that the number of transport elements rests in a second number of cutouts in the upper portion;
sliding the upper portion along the number of transport elements toward the lower portion such that the first number of cutouts and the second number of cutouts surround a periphery of each of the number of transport elements;
securing the upper portion to the lower portion, wherein the transport element clamp system electrically isolates the number of transport elements from a first support structure and a second support structures;
securing a first half of an insert to the lower portion using a first locking pin, wherein the first half of the insert is positioned in a first cutout in the lower portion; and
securing a second half of the insert to the upper portion using a second locking pin, wherein the second half of the insert is positioned in a second cutout in the upper portion.

9. The method of claim 8 further comprising:
fastening a first end of the transport element clamp system to a first bracket on the first support structure; and
fastening a second end of the transport element clamp system to a second bracket on the second support structure.

10. The method of claim 8, wherein the lower portion comprises a first cantilever and a first clip and the upper portion comprises a second cantilever and a second clip, and wherein securing the upper portion to the lower portion comprises:
engaging the first cantilever on the lower portion with the second clip on the upper portion; and
engaging the second cantilever on the upper portion with the first clip on the lower portion.

11. An aircraft comprising:
support structures;
a number of transport elements running parallel to the support structures within a gap between the support structures; and
a transport element clamp system comprising:
a lower portion having a first number of cutouts and configured to bridge the gap between the support structures;
an upper portion having a second number of cutouts and configured to interlock with the lower portion; and
a channel system formed by the first number of cutouts and the second number of cutouts, wherein the channel system is configured to receive the number of transport elements, and wherein the transport element clamp system electrically isolates the number of transport elements from the support structures.

12. The aircraft of claim 11, wherein the upper portion and the lower portion are interchangeable.

13. The aircraft of claim 11, wherein the lower portion, the upper portion, and an insert are comprised of a dielectric material.

14. The aircraft of claim 11, wherein the transport element clamp system further comprises:
a locking mechanism configured to secure the lower portion to the upper portion such that the lower portion and the upper portion share loads placed on the transport element clamp system during operation of the aircraft.

15. The aircraft of claim 14, wherein the transport element clamp system further comprises:
an insert, wherein a first half of the insert is positioned in a first cutout in the lower portion and a second half of the insert is positioned in a second cutout in the upper portion, and wherein the first half of the insert and the second half of the insert surround a periphery of a transport element to stabilize the transport element.

16. The aircraft of claim 15, wherein the first half of the insert is secured to the lower portion with a first locking pin and the second half of the insert is secured to the upper portion with a second locking pin.

17. The aircraft of claim 11 further comprising a number of inserts positioned within the channel system in contact with the number of transport elements and configured to stabilize the number of transport elements.

18. A transport element clamp system comprising:
a lower portion having a first number of cutouts and configured to bridge a gap between two support structures in an aircraft;
an upper portion having a second number of cutouts and configured to interlock with the lower portion;
a channel system formed by the first number of cutouts and the second number of cutouts, wherein the channel system is configured to receive a number of transport elements when the upper portion and the lower portion are coupled to each other;
a number of inserts positioned within the channel system configured to be in contact with the number of transport elements and configured to stabilize the number of transport elements;
a locking mechanism configured to secure the lower portion to the upper portion such that the lower portion and the upper portion share loads placed on the transport element clamp system during operation of the aircraft; and wherein the locking mechanism comprises:
- a first clip on a first side of the lower portion;
- a first cantilever on a second side of the lower portion;
- a second clip on a first side of the upper portion configured to engage with the first cantilever on the second side of the lower portion; and
- a second cantilever on a second side of the upper portion configured to engage with the first clip on the first side of the lower portion.

19. The transport element clamp system of claim 18, wherein the upper portion and the lower portion are interchangeable.

20. The transport element clamp system of claim 18, wherein the lower portion, the upper portion, and an insert of the number of inserts are comprised of a dielectric material.

* * * * *